(12) United States Patent
Pedersen

(10) Patent No.: US 10,968,898 B2
(45) Date of Patent: Apr. 6, 2021

(54) GUIDING DEVICE

(71) Applicant: ØRSTED WIND POWER A/S, Fredericia (DK)

(72) Inventor: Jan Pedersen, Børkop (DK)

(73) Assignee: Ørsted Wind Power A/S

(\*) Notice: Subject to any disclaimer, the term of this patent is extended or adjusted under 35 U.S.C. 154(b) by 0 days.

(21) Appl. No.: 16/464,114

(22) PCT Filed: Oct. 10, 2017

(86) PCT No.: PCT/EP2017/757850
§ 371 (c)(1),
(2) Date: May 24, 2019

(87) PCT Pub. No.: WO2018/095643
PCT Pub. Date: May 31, 2018

(65) Prior Publication Data
US 2019/0368474 A1  Dec. 5, 2019

(30) Foreign Application Priority Data
Nov. 28, 2016 (EP) .................................... 16200884

(51) Int. Cl.
*F16L 5/02* (2006.01)
*F03D 80/80* (2016.01)
(Continued)

(52) U.S. Cl.
CPC ............. *F03D 80/85* (2016.05); *F03D 9/255* (2017.02); *H02G 1/10* (2013.01); *H02G 3/22* (2013.01);
(Continued)

(58) Field of Classification Search
CPC combination set(s) only.
See application file for complete search history.

(56) References Cited

U.S. PATENT DOCUMENTS 4,058,987 A  11/1977 Gerbault et al.
4,240,767 A  12/1980 Gracia
(Continued)

FOREIGN PATENT DOCUMENTS

EP  1 049 228      11/2000
EP  2 784 364 A1  10/2014
(Continued)

OTHER PUBLICATIONS

JP S5327202 U, European examiner cited this reference in an e-mail correspondance dated Oct. 7, 2020.

*Primary Examiner* — Kyle Armstrong
(74) *Attorney, Agent, or Firm* — Condo Roccia Koptiw LLP

(57) ABSTRACT

Disclosed is a guiding device for guiding an elongated element such as a cable or a pipe from the exterior into a hollow interior of a support element, the support element being a support element for supporting an offshore structure and being at least partly submerged in water, wherein the guiding device comprises; a tube having a first opening at a first end for facing the exterior and a second opening at a second end opposite to the first end for facing the hollow interior of the support element. The guiding device is configured to allow water to flow into the first opening and out of the second opening of the tube, and substantially prevent water from flowing into the second opening and out of the first opening whereby the guiding device allows water to enter the hollow interior of the support element but not exit the hollow interior.

12 Claims, 6 Drawing Sheets

(51) Int. Cl.
  *F03D 9/25* (2016.01)
  *H02G 1/10* (2006.01)
  *H02G 3/22* (2006.01)
  *H02G 15/013* (2006.01)

(52) U.S. Cl.
  CPC ............. *F05B 2240/95* (2013.01); *F16L 5/02* (2013.01); *H02G 15/013* (2013.01)

(56) References Cited

U.S. PATENT DOCUMENTS

| | | |
|---|---|---|
| 6,003,873 A | 12/1999 | Solberg |
| 2006/0196539 A1 | 9/2006 | Raska et al. |
| 2011/0140426 A1 | 6/2011 | Garcia Lopez et al. |

FOREIGN PATENT DOCUMENTS

| | | |
|---|---|---|
| EP | 2426356 B | 10/2016 |
| JP | S5327202 U | 10/2013 |
| WO | WO 2011/141494 A1 | 11/2011 |
| WO | 2012/167015 A2 | 12/2012 |
| WO | WO 2013/050451 A2 | 4/2013 |

GUIDING DEVICE

CROSS REFERENCE TO RELATED APPLICATIONS

This application is the National Stage Entry under 35 U.S.C. § 371 of Patent Cooperation Treaty Application No. PCT/EP2017/075785, filed Oct. 10, 2017, which claims priority from European Application No. 16200884.1, filed Nov. 28, 2016, the contents of which are hereby incorporated by reference herein.

FIELD

The present invention relates to a guiding device for guiding an elongated element such as a cable or a pipe from the exterior into a hollow interior of a support element, the use of a guiding device, and to a support element.

BACKGROUND

Corrosion represents a significant problem in many industries. It damages structures and reduces their lifetime and characteristics. Especially offshore support elements which are submerged in water are greatly exposed to corrosive environments.

Seawater increases the corrosion process because of the presence of salts which acts as electrolytes. It is therefore a very important issue for offshore wind turbines for example. Wind turbines are typically supported by structures such as monopiles, having a hollow interior that is vulnerable to corrosion.

However, if the exchange of water inside the hollow interior is prevented, the oxygen present inside will be consumed. Once it is consumed, the corrosion processes end.

On top of the corrosion problems, offshore wind turbines are also facing marine currents and waves, which can cause damage to structures like for example cables which can be exposed when being on the side of the wind turbine support elements. To overcome this, it is well known to guide the cables into the support elements using guiding devices such as j-tubes.

Nevertheless, the sealing of these guiding devices to prevent exchange of water in the interior of the support element can be challenging.

U.S. Pat. No. 6,003,873 discloses a method and a device for sealing an entrance of an offshore tube with an elongated element and a device for sealing an entrance of an offshore tube with an elongated element. The sealing device comprises a plug-like device adapted to be fixed on an outer surface of the element at the entrance of the tube, an outer diameter of the plug-like device being smaller than an inner diameter of the tube so as to create a space between an outer surface of the plug-like device and an inner surface of the tube, the plug includes at least one expandable foam container arranged to introduce expandable foam into the space, a gas cartridge arranged to operate the at least one foam container and internal ducts for leading the expandable foam to the space provided between the plug-like device and the tube.

The process is, however, very complex and involves many steps.

Thus, it remains a problem to provide a simple guiding device.

SUMMARY

According to a first aspect, the invention relates to a guiding device for guiding an elongated element such as a cable or a pipe from the exterior into a hollow interior of a support element, the support element being a support element for supporting an offshore structure and being at least partly submerged in water, wherein said guiding device comprises;

a tube having a first opening at a first end for facing the exterior and a second opening at a second end opposite to the first end for facing the hollow interior of the support element;

wherein said guiding device is configured to allow water to flow into said first opening and out of the second opening of said tube, and substantially prevent water from flowing into the second opening and out of the first opening whereby said guiding device allows water to enter said hollow interior of said support element but not exit said hollow interior.

By having a guiding device configured to prevent water from flowing out of the interior, the water pressure inside the interior will become equal or larger than the water pressure of the exterior as explained in relation to figure FIG. 2c. This will prevent the exchange of water.

Consequently, a simpler guiding device is provided as it only needs to be configured to prevent flow in one direction.

Furthermore, by having a high water pressure inside the interior, buckling of the support element may be reduced. The higher water pressure will also increase the amount of water stored in the hollow interior of the support element and thereby the weight of the support element.

The elongated element may be a cable or a pipe. The cable may be an electrical cable e.g. a power cable or communication cable. The pipe may be any type of pipe such as a guiding pipe or a pipe for moving a fluid such as oil, gas or grout. The support element may be a foundation monopile, a space frame structure e.g. a jacket or a tripod, a compliant tower, a gravity structure or a floating structure for an offshore structure such as a TLP (tension leg platform), a Semi-Submersible, a spar platform or a tri-pile or any other support element known to the person skilled in the art.

The hollow interior may extend substantially throughout all of the support element, such as in a monopile or a part of the support element such as a leg of a tripod. The exterior is a volume surrounding the support element. The exterior may be a volume of water or a combination of a volume of water and a volume of air.

The flow resistance of the guiding device for the flow into said second opening and out of said first opening may be at least 10 times larger, 50 times larger, 500 times larger, 1000 times larger, or 10000 times larger than the flow resistance of said guiding device for the flow into said first opening and out of said second opening. The offshore structure may be a wind turbine, a hybrid wind and wave turbine, an oil and gas platform, a submarine pipeline, a subsea oil and gas structure or a floating structure.

The tube may have any cross-sectional shape such as round or rectangular. The tube may be made of a rigid material such as a metal material, a plastic material, or a composite material. The tube may have a length longer than the wall thickness of the support element or a length matching that of the wall thickness. The tube may be a separate element separate from the wall of the support element or an integral part of the support element.

In some embodiments, the offshore structure is an offshore wind turbine.

In some embodiments, the tube has a first portion and a second portion, the first portion being proximal to the first opening.

In some embodiments, the first portion has a straight shape and the second portion has a curved shape e.g. the tube may be a j-tube.

In some embodiments, the guiding device further comprises one or more closing elements said one or more closing elements being configured to allow water to flow into said first opening and out of the second opening of said tube, and substantially prevent water from flowing into the second opening and out of the first opening.

In some embodiments, a first part of each of the one or more closing elements is attached to the tube and a second part is configured to seal around the elongated element.

The one or more closing elements may be made of a flexible material such as synthetic or natural rubber, isobutene, styrene, polyurethane, polyethylene, polypropylene, PVC, nylon or PTFE. The one or more closing elements may be a single closing element. The one or more closing elements may function as a one-way valve. The one or more closing elements may be at least two closing elements.

In some embodiments, the one or more closing elements is/are configured to be pressed against the elongated element and prevent water from flowing in the tube, when the water pressure inside the hollow interior of the support element at a particular height is greater than the water pressure outside the support element at said particular height.

Consequently, by using the pressure difference to press the one or more closing elements against the elongated element, the tightness of the one or more closing element will increase when the pressure difference increases. This will result in an effective prevention of flow even for large pressure differences.

In some embodiments, the one or more closing elements are configured to be pressed away from the elongated element and allow water to flow in the tube, when the water pressure inside the hollow interior of the support element at a particular height is lower than water pressure outside the support element at said particular height.

In some embodiments, the one or more closing elements is a hose made of a flexible material where a part of said tube is inserted into a first part of said hose in a manner whereby said first part of said hose fits snugly around said part of said tube and wherein a second part of said hose is configured to be pressed against the elongated element and prevent water from flowing in said tube, when the water pressure inside the hollow interior of the support element at a particular height is greater than the water pressure outside the support element at said particular height and furthermore configured to be pressed away from the elongated element and allow water to flow in the tube, when the water pressure inside the hollow interior of the support element at said particular height is lower than water pressure outside the support element at said particular height.

According to a second aspect, the invention relates to a support element for supporting an offshore structure and being at least partly submerged in water, the support element having one or more walls defining a hollow interior, the one or more walls having a through hole for guiding an elongated element such as a cable or a pipe from the exterior into the hollow interior of the support element, the through hole having a first opening at a first end of the through hole for facing the exterior and a second opening at a second end of the through hole opposite to the first end for facing the hollow interior of the support element;
wherein the through hole is configured to allow water to flow into said first opening and out of said second opening of the through hole, and substantially prevent water from flowing into said second opening and out of said first opening whereby said through hole allows water to enter said hollow interior of said support element but not exit said hollow interior.

In some embodiments, the support element comprises a tube having a first opening at a first end for facing the exterior and a second opening at a second end opposite to the first end for facing the hollow interior of the support element wherein the tube forms the through hole whereby the first opening of the through hole is the first opening of the tube and the second opening of the through hole is the second opening of the tube.

In some embodiments, the support element is configured to substantially prevent water from exiting the hollow interior whereby exchange of water is prevented.

In some embodiments, the offshore structure is an offshore wind turbine.

In some embodiments, an elongated element such as a cable or a pipe is guided through the tube from the exterior into the hollow interior of the support element.

In some embodiments, the tube has a first portion and a second portion, the first portion being proximal to the first opening.

In some embodiments, the first portion has a straight shape and the second portion has a curved shape e.g. the tube may be a j-tube In some embodiments, the through hole is provided with one or more closing elements said one or more closing elements being configured to allow water to flow into said first opening and out of the second opening of said through hole, and substantially prevent water from flowing into the second opening and out of the first opening.

In some embodiments, a first part of each of the one or more closing elements is attached to the tube and a second part is configured to seal around the elongated element.

In some embodiments, the one or more closing elements are configured to be pressed against the elongated element and prevent water from flowing in the tube, when the water pressure inside the hollow interior of the support element at a particular height is greater than the water pressure outside the support element at said particular height.

In some embodiments, the one or more closing elements are configured to be pressed away from the elongated element and allow water to flow in the tube, when the water pressure inside the hollow interior of the support element at a particular height is lower than water pressure outside the support element at said particular height.

In some embodiments, the one or more closing elements is a hose made of a flexible material where a part of said tube is inserted into a first part of said hose in manner whereby said first part of said hose fits snugly around said tube and wherein a second part of said hose is configured to be pressed against the elongated element and prevent water from flowing in said tube, when the water pressure inside the hollow interior of the support element at a particular height is greater than the water pressure outside the support element at said particular height and furthermore configured to be pressed away from the elongated element and allow water to flow in the tube, when the water pressure inside the hollow interior of the support element at said particular height is lower than water pressure outside the support element at said particular height.

In some embodiments, the support element comprises a plurality of guiding devices as disclosed in relation to the first aspect of the invention, whereby a plurality of elongated elements may be guided into the hollow interior of the support element.

According to a third aspect the invention relates to use of a guiding device as disclosed in relation to the first aspect of the invention for guiding an elongated element such as a cable or a pipe from the exterior water into a hollow interior of a support element, wherein the support element is supporting an offshore structure and is at least partly submerged in water.

The different aspects of the present invention can be implemented in different ways including as guiding devices, support elements and use of guiding devices described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependant claims. Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention will be further elucidated by the following illustrative and non-limiting detailed description of embodiments of the present invention, with reference to the appended drawings, wherein:

FIG. 1b shows a close-up of a part of FIG. 1a.

DETAILED DESCRIPTION

In the following description reference is made to the accompanying figures, which show by way of illustration how the invention may be practiced.

Figure 1A:
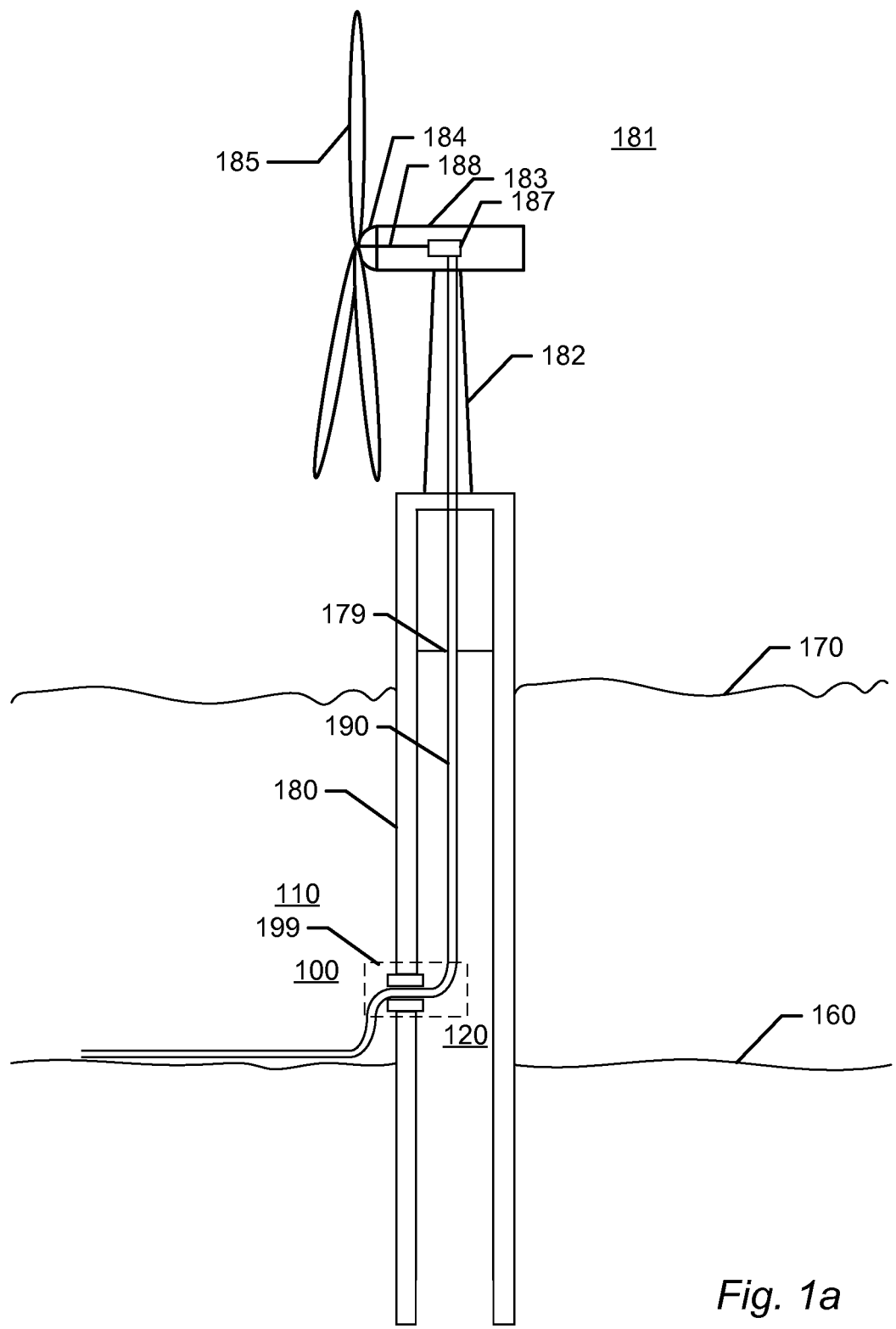
FIG. 1a shows a schematic drawing of an offshore wind turbine arranged on a support element, according to an embodiment of the present invention.
Figure 1B:
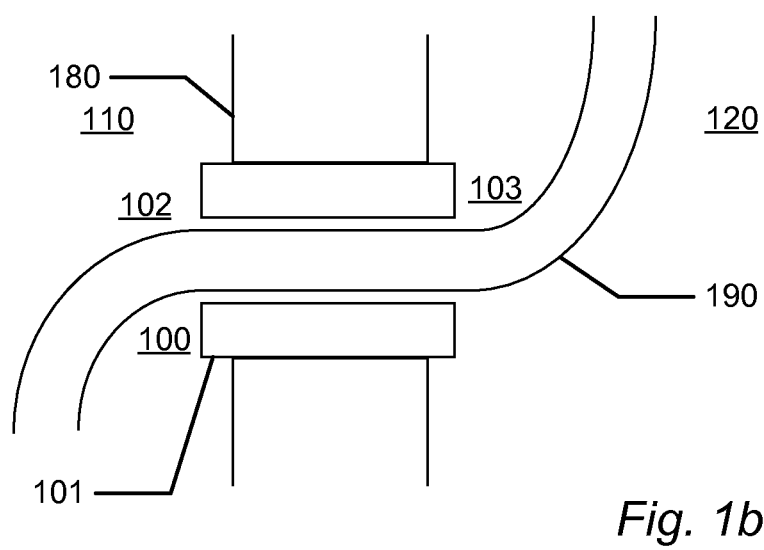

FIG. 1a shows a schematic drawing of an offshore wind turbine 181 arranged on a support element 180 according to an embodiment of the present invention. FIG. 1b shows a close-up of the part of FIG. 1a marked by the dotted rectangle 199. In the following reference will be made to FIG. 1a and FIG. 1b. The wind turbine 181 is a horizontal-axis wind turbine. The wind turbine 181 comprises a tower 182, a nacelle 183, and a rotor hub 184 connected to three rotor blades 185. The rotor blade/rotor hub assembly is connected to a shaft 188 that drives a generator 187. The generator 187 generates electric energy that is provided to the grid via an electric cable 190. The support element 180 is partly submerged in water 170 and partly embedded into the seabed 160. The electrical cable 190 is guided using a guiding device 100, into a hollow interior 120 of the support element 180 from the exterior water 110. The support element 180 is in this embodiment a monopile structure.

The guiding device (100) comprises a tube (101) having a first opening (102) at a first end for facing the exterior (110) and a second opening (103) at a second end opposite to the first end for facing the hollow interior (120) of the support element (180). The guiding device (100) is configured to allow water to flow into the first opening (102) and out of the second opening (103) of the tube (101), and substantially prevent water from flowing into the second opening (103) and out of the first opening (102) whereby the guiding device (100) allows water to enter said hollow interior (120) of the support element (180) but not exit the hollow interior (120). By having a guiding device 100 configured to prevent water from flowing out of the interior 120, the water pressure inside the interior 120 will after some time with high tides and large waves become equal or larger than the water pressure of the exterior. This will prevent the exchange of water between the hollow interior and the exterior and thereby stop the corrosions processes. The pressure inside the hollow interior is larger than the pressure of the exterior, illustrated by the water level of the hollow interior 179 being above the water level of the exterior 170. Consequently, buckling of the support element may be reduced. The increased amount of water will furthermore increase the weight of the support element.

Figure 2A:
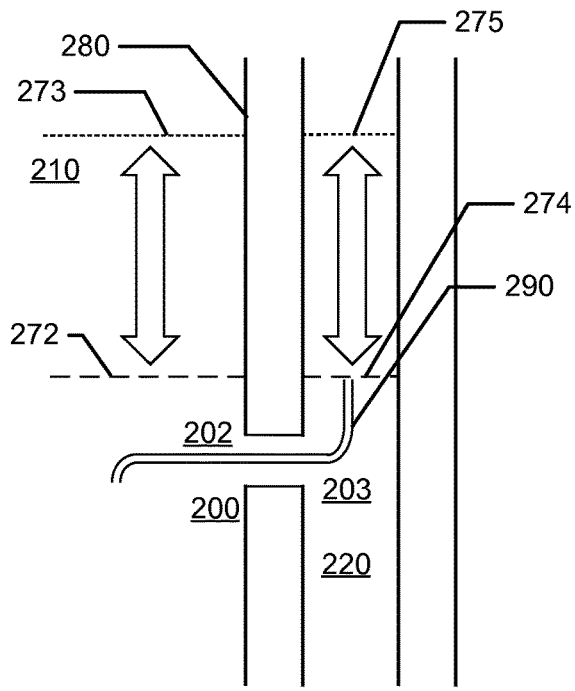
FIGS. 2a-c show schematic drawings of the water level inside and outside a support element, depending on how an elongated element is inserted into the support element.
Figure 2B:
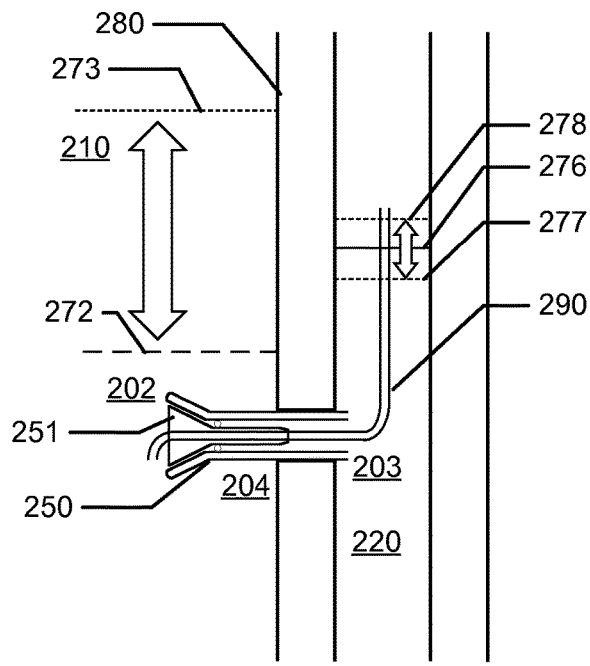
Figure 2C:
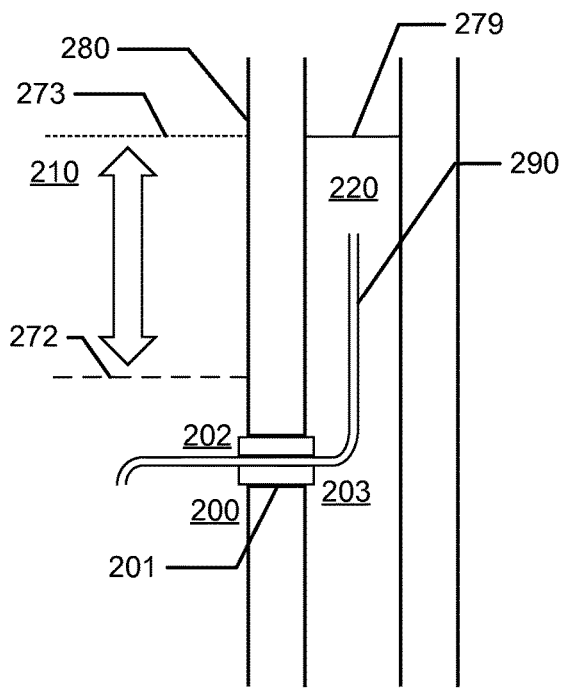

FIGS. 2a-c show schematic drawings of the water level inside and outside a support element 280, depending on how a cable 290 is inserted into the support element 280. FIG. 2a shows the situation where the cable 290 is inserted through a through hole in the support element. The through hole having a first opening 202 and a second opening 203. In this situation, the water level in the hollow interior follows the water level of the exterior. Consequently, the maximum water level of the exterior 273 is equivalent to the maximum water level in the hollow interior 275, and the minimum water level of the exterior 272 is equivalent to the minimum water level in the hollow interior 274. The difference in the exterior water level may result from tidal forces, floods and/or waves. FIG. 2b shows the situation where the cable 290 is guided into the support element 280 by a guiding device 204. The guiding device 204 comprises a tube 250, a sealing plug 251, a first opening 202 and a second opening 203. The plug 251 is fitted around the cable 290 and seals the tube 250. With this kind of guiding device, the water level 276 in the hollow inside will theoretically be constant, at the level it was at the moment of the insertion of the plug into the tube 250. However, in reality the sealing plug 251 is often not completely tight, and the water level in the hollow interior will fluctuate from a level 277 to a level 278. FIG. 2c shows the situation where the cable 290 is guided into the support element 280 by the guiding device 200, according to an embodiment of the invention. The guiding device 200 comprises a tube 201, a first opening 202 and a second opening 203. The guiding device 200 is configured to allow water to flow into the first opening 202 and out of the second opening 203 of the tube 201, and substantially prevent water from flowing into the second opening 203 and out of the first opening 202 whereby the guiding device 200 allows water to enter the hollow interior 220 of the support element 280 but not exit the hollow interior 220. The water level in the hollow interior will therefore remain at a substantially constant level 279 being substantially equal to the maximum water level of the exterior 273.

Figure 3A:
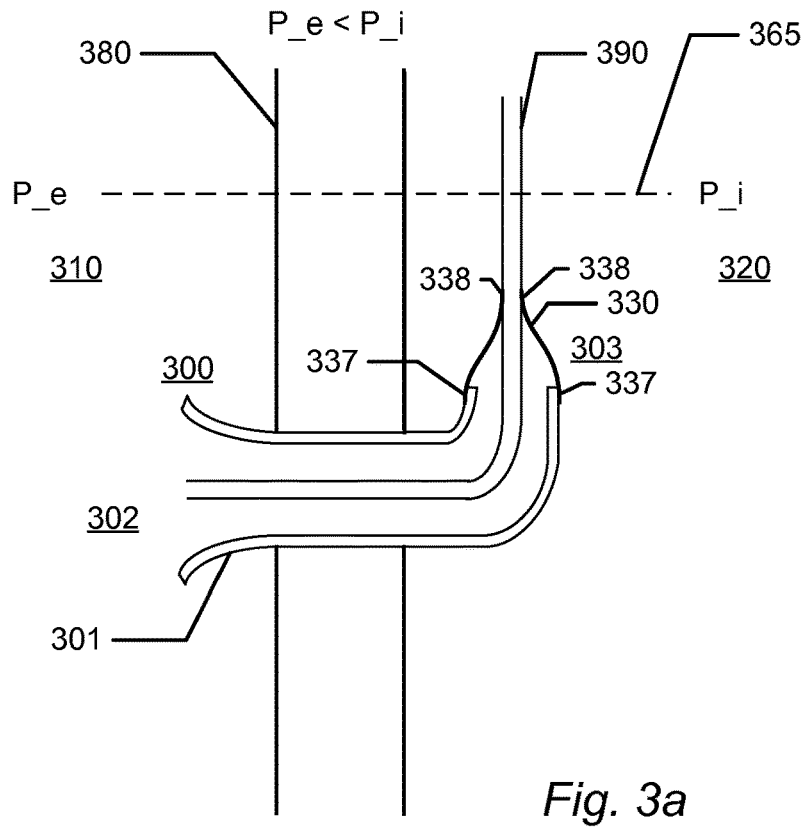
FIGS. 3a-b show a guiding device for guiding an elongated element such as a cable or a pipe from the exterior into a hollow interior of a support element, according to an embodiment of the invention
Figure 3B:
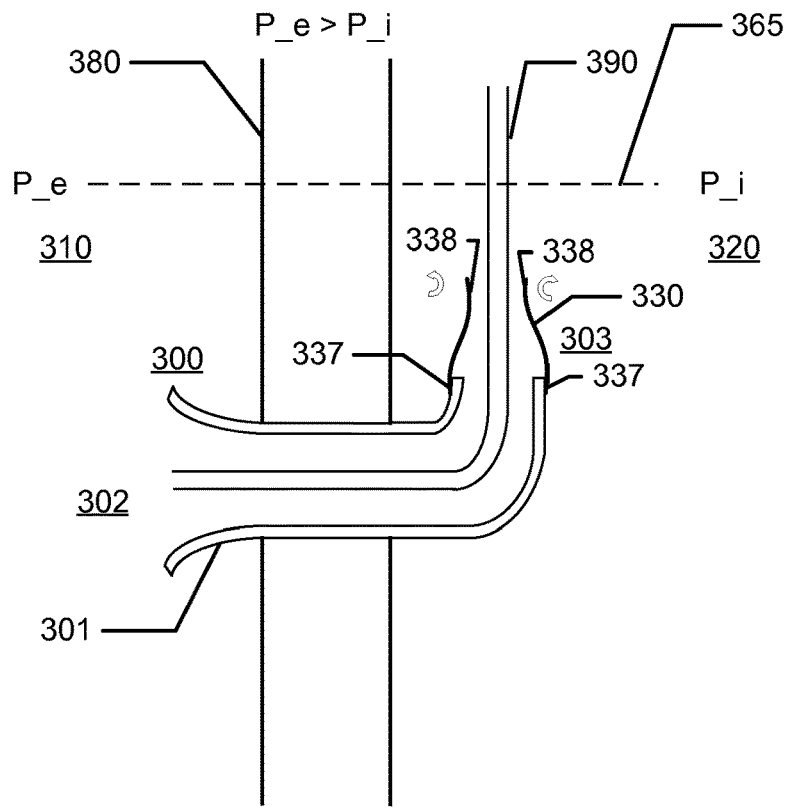

FIGS. 3a-b show a guiding device 300 for guiding an elongated element 390 such as a cable or a pipe from the exterior 310 into a hollow interior 320 of a support element 380, according to an embodiment of the invention. FIG. 3a shows the guiding device 300 in a state when the water pressure P_i inside the hollow interior 320 at a particular height 365 is greater than the water pressure P_e outside the support element 380 at the particular height 365. FIG. 3b shows the guiding device 300 in a state when the water pressure P_i inside the hollow interior 320 at a particular height 365 is lower than the water pressure P_e outside the support element at the particular height 365. The guiding device 300 comprises a tube 301 having a first opening 302 at a first end for facing the exterior 310 and a second opening 303 at a second end opposite to the first end for facing the hollow interior 320 of the support element 380.

The guiding device 300 further comprises a closing element 330 configured to allow water to flow into the first opening 302 and out of the second opening 303 of the tube 301, and prevent water from flowing into the second opening 303 and out of the first opening 302, i.e. when P_i is greater than P_e the closing element 330 will prevent water from flowing in the tube 301 as shown in FIG. 3a and when P_i is lower than P_e the closing element 330 will allow water to flow in the tube 301 as shown in FIG. 3b. The closing element 330 is configured to be pressed against the elongated element and thereby prevent water from flowing in the tube, when P_i is greater than P_e as shown in FIG. 3a. Consequently, by using the pressure difference to press the closing element 330 against the elongated element, the flow in the tube 301 may be effectively prevented even when P_i is significantly higher than P_e. Furthermore, the closing element 330 is configured to be pressed away from the elongated element 390 and allow water to flow in the tube 301, when P_i is lower than P_e, as shown in FIG. 3b. In this embodiment the closing element 330 is a hose made of a flexible material where a part of the tube 301 is inserted into a first part of the hose 337 in a manner whereby the first part of the hose 337 fits snugly around the tube 301 and wherein a second part of the hose 338 is configured to be pressed against the elongated element 390. Consequently, by using a hose as disclosed above a simple guiding device is provided configured to prevent water from flowing out of the hollow interior of the support element.

Figure 4:
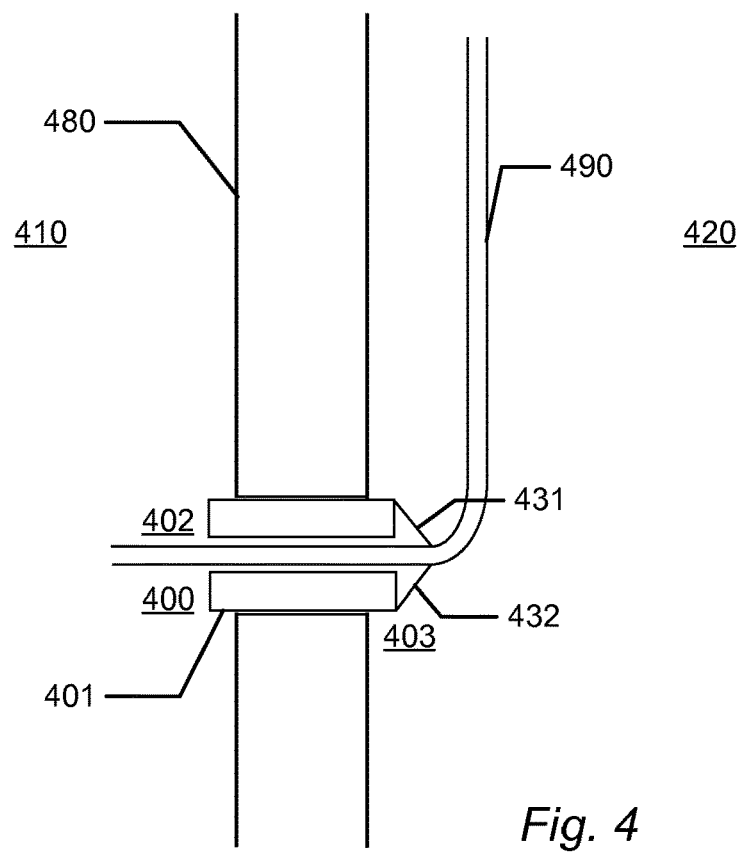
FIG. 4 shows a schematic drawing of a guiding device, according to an embodiment of the invention.

FIG. 4 shows a schematic drawing of a guiding device 400 for guiding an elongated element 490 such as a cable or a pipe from the exterior 410 into a hollow interior 420 of a support element 480, according to an embodiment of the invention. The guiding device 400 comprises a tube 401 having a first opening 402 at a first end for facing the exterior 410 and a second opening 403 at a second end opposite to the first end for facing the hollow interior 420 of the support element 480. In this embodiment, the guiding device 400 further comprises two closing element 431 432 configured to allow water to flow into said first opening 402 and out of the second opening 403 of said tube 401, and substantially prevent water from flowing into the second opening 403 and out of the first opening 402. A first part of each of the two closing elements 431 432 is attached to the tube 402 and a second part is configured to seal around the elongated element 490.

Figure 5:
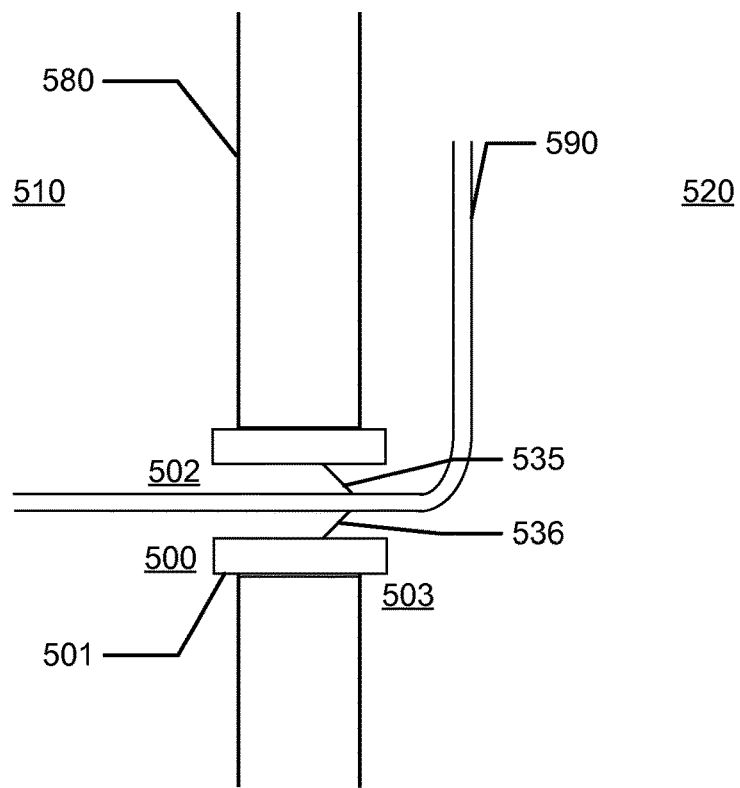
FIG. 5 shows a schematic drawing of a guiding device, according to an embodiment of the invention.

FIG. 5 shows a schematic drawing of a guiding device 500 for guiding an elongated element 590 such as a cable or a pipe from the exterior 510 into a hollow interior 520 of a support element 580, according to an embodiment of the invention. The guiding device 500 comprises a tube 501 having a first opening 502 at a first end for facing the exterior 510 and a second opening 503 at a second end opposite to the first end for facing the hollow interior 520 of the support element 580. In this embodiment, the guiding device 500 further comprises two closing element 535 536 configured to allow water to flow into said first opening 502 and out of the second opening 503 of said tube 501, and substantially prevent water from flowing into the second opening 503 and out of the first opening 502. A first part of each of the two closing elements 531 532 is attached to the tube 502 and a second part is configured to seal around the elongated element 590. In this embodiment, the closing elements 531 532 are attached to the tube 501 inside the through hole of the tube 501.

Figure 6:
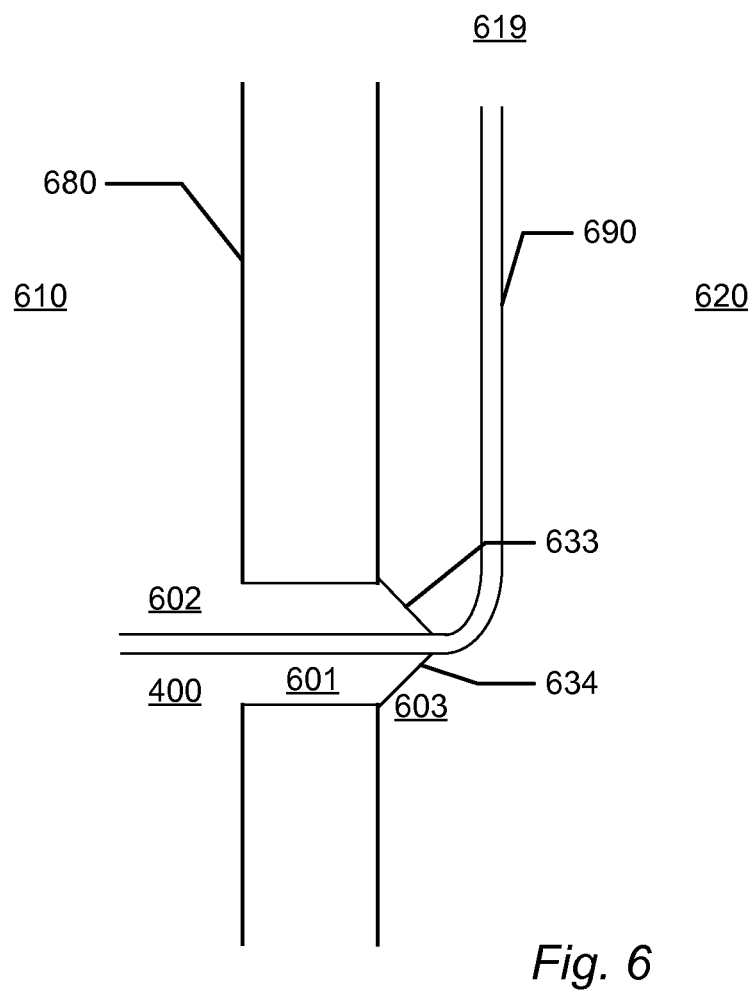
FIG. 6 shows a part of a support element for supporting an offshore structure and being at least partly submerged in water, according to an embodiment of the present invention.

FIG. 6 shows a part of a support element 619 for supporting an offshore structure and being at least partly submerged in water, according to an embodiment of the present invention. The support element has a wall 680 defining a hollow interior 620. The wall 680 has a through hole 601 that guides an elongated element 690 such as a cable or a pipe from the exterior 610 into the hollow interior 620 of the support element 619, i.e. the through hole forms a tube for guiding the elongated element 690. The through hole 601 has a first opening 602 at a first end of the through hole for facing the exterior 610 and a second opening 603 at a second end of the through hole 601 opposite to the first end for facing the hollow interior 620 of the support element 619. The through hole 601 is provided with two closing elements 633 634 configured to allow water to flow into the first opening 602 and out of the second opening 603 of the through hole 601, and substantially prevent water from flowing into the second opening 603 and out of the first opening 602.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A guiding device for guiding an elongated element from an exterior of a support element into a hollow interior of the support element, the support element being a support element for supporting an offshore structure and being at least partly submerged in water, wherein said guiding device comprises:

a tube comprising a first opening at a first end facing the exterior and a second opening at a second end opposite to the first end facing the hollow interior of the support element; and one or more closing elements
configured to allow water to flow into said first opening and out of the second opening of said tube, and substantially prevent water from flowing into the second opening and out of the first opening, and wherein said guiding device allows water to enter said hollow interior of said support element but not exit said hollow interior, and wherein the one or more closing elements are configured to be pressed away from the elongated element and allow water to flow in the tube when a water pressure inside the hollow interior of the support element at a particular height is lower than a water pressure outside the support element at said particular height.

2. The guiding device of claim 1, wherein the offshore structure is an offshore wind turbine.

3. The guiding device of claim 1, wherein a first part of each of the one or more closing elements is attached to the tube and a second part is configured to seal around the elongated element.

4. The guiding device of claim 1, wherein the one or more closing elements are configured to be pressed against the elongated element and prevent water from flowing in the tube, when the water pressure inside the hollow interior of the support element at a particular height is greater than the water pressure outside the support element at said particular height.

5. The guiding device of claim 1, wherein the one or more closing elements comprise a hose made of a flexible material where a part of said tube is inserted into a first part of said hose in a manner such that said first part of said hose fits snugly around said part of said tube and wherein a second part of said hose is configured to be pressed against the elongated element and prevent water from flowing in said tube, when the water pressure inside the hollow interior of the support element at a particular height is greater than the water pressure outside the support element at said particular height, and
wherein the second part of said hose is configured to be pressed away from the elongated element and allow water to flow in the tube, when the water pressure inside the hollow interior of the support element at said particular height is lower than water pressure outside the support element at said particular height.

6. The guiding device of claim 1, wherein the elongate element comprises a cable or a pipe.

7. A support element for supporting an offshore structure and being at least partly submerged in water, the support element comprising one or more walls defining a hollow interior, the one or more walls comprising a through hole configured to guide an elongated element from an exterior of the support element into the hollow interior of the support element, the through hole comprising a first opening at a first end of the through hole facing the exterior and a second opening at a second end of the through hole opposite to the first end facing the hollow interior of the support element,
wherein the through hole comprises one or more closing elements configured to allow water to flow into said first opening and out of said second opening of the through hole, and substantially prevent water from flowing into said second opening and out of said first opening, and
wherein said through hole allows water to enter said hollow interior of said support element but not exit said hollow interior, and
wherein the one or more closing elements are configured to be pressed against the elongated element and prevent water from flowing in the through hole, when a water pressure inside the hollow interior of the support element at a particular height is greater than a water pressure outside the support element at said particular height.

8. The support element of claim 7, wherein the support element comprises a tube having a first opening at a first end facing the exterior and a second opening at a second end opposite to the first end facing the hollow interior of the support element wherein the tube forms the through hole such that the first opening of the through hole is the first opening of the tube and the second opening of the through hole is the second opening of the tube.

9. The support element of claim 8, wherein the one or more closing elements comprise a hose made of a flexible material where a part of said tube is inserted into a first part of said hose in a manner such that said first part of said hose fits snugly around said tube, and
wherein a second part of said hose is configured to be pressed against the elongated element and prevent water from flowing in said tube, when the water pressure inside the hollow interior of the support element at a particular height is greater than the water pressure outside the support element at said particular height, and
wherein the second part of said hose is configured to be pressed away from the elongated element and allow water to flow in the tube, when the water pressure inside the hollow interior of the support element at said particular height is lower than water pressure outside the support element at said particular height.

10. The support element of claim 7, wherein the support element is configured to substantially prevent water from exiting the hollow interior such that exchange of water is prevented.

11. The support element of claim 7, wherein the offshore structure is an offshore wind turbine.

12. The support element of claim 7, wherein the elongate element comprises a cable or a pipe.

* * * * *